(12) United States Patent
Warpinski et al.

(10) Patent No.: US 12,083,714 B2
(45) Date of Patent: Sep. 10, 2024

(54) METHODS AND APPARATUS FOR TOOLING IN LAYERED STRUCTURES FOR INCREASED JOINT PERFORMANCE

(71) Applicant: The Boeing Company, Chicago, IL (US)

(72) Inventors: Luke G. Warpinski, Philadelphia, PA (US); Michael D. Nevinsky, Media, PA (US); Kenneth W. Young, Bear, DE (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/048,327

(22) Filed: Oct. 20, 2022

(65) Prior Publication Data

US 2024/0131754 A1 Apr. 25, 2024
US 2024/0227249 A9 Jul. 11, 2024

(51) Int. Cl.
  *B32B 3/30* (2006.01)
  *B29C 33/52* (2006.01)
  *B29C 70/34* (2006.01)
  *B32B 7/12* (2006.01)
  *B29L 31/30* (2006.01)

(52) U.S. Cl.
  CPC .............. *B29C 33/52* (2013.01); *B29C 70/34* (2013.01); *B32B 3/30* (2013.01); *B32B 7/12* (2013.01); *B29L 2031/3076* (2013.01); *B32B 2605/18* (2013.01)

(58) Field of Classification Search
  None
  See application file for complete search history.

(56) References Cited

U.S. PATENT DOCUMENTS

| | | | |
|---|---|---|---|
| 8,049,193 B1* | 11/2011 | Appleby | B29C 33/3842 378/155 |
| 2015/0137416 A1 | 5/2015 | Patrick et al. | |
| 2020/0023537 A1* | 1/2020 | Fetfatsidis | B26D 5/007 |
| 2021/0170714 A1* | 6/2021 | Pelletier | B32B 15/14 |

OTHER PUBLICATIONS

Esser-Kahn et al., "Three-Dimensional Microvascular Fiber-Reinforced Composites," Advanced Materials (Year 2011), 5 pages.
Gergely et al., "Multidimensional Vascularized Polymers using Degradable Sacrificial Templates," Advanced Functional Materials (Year 2014), 10 pages.
Patrick et al., "Robust sacrificial polymer templates for 3D interconnected microvasculature in fiber-reinforced composites," Composites: Part A (Year 2017), 10 pages.
Fast Radius, "Why does 3D printing layer height matter?," Fast Radius, Inc., Nov. 8, 2021, [https://www.fastradius.com/resources/why-3d-printing-layer-height-matter/#:~:text=Key%20considerations%20for%203D%20printer%20layer%20height,-When%20deciding%20your&text=When%20printing%20a%20part%20via] retrieved on Jul. 12, 2023, 5 pages.

* cited by examiner

*Primary Examiner* — Mohammad M Ameen
(74) *Attorney, Agent, or Firm* — HANLEY, FLIGHT & ZIMMERMAN, LLC

(57) ABSTRACT

Methods and apparatus for tooling in layered structures for increased joint performance are disclosed. A disclosed example method includes placing a tool onto a first substrate to define an impression in the first substrate, curing the first substrate, removing the tool from the first substrate to define a joint interface corresponding to the impression, and coupling, at the joint interface, the first substrate to a second substrate.

15 Claims, 13 Drawing Sheets

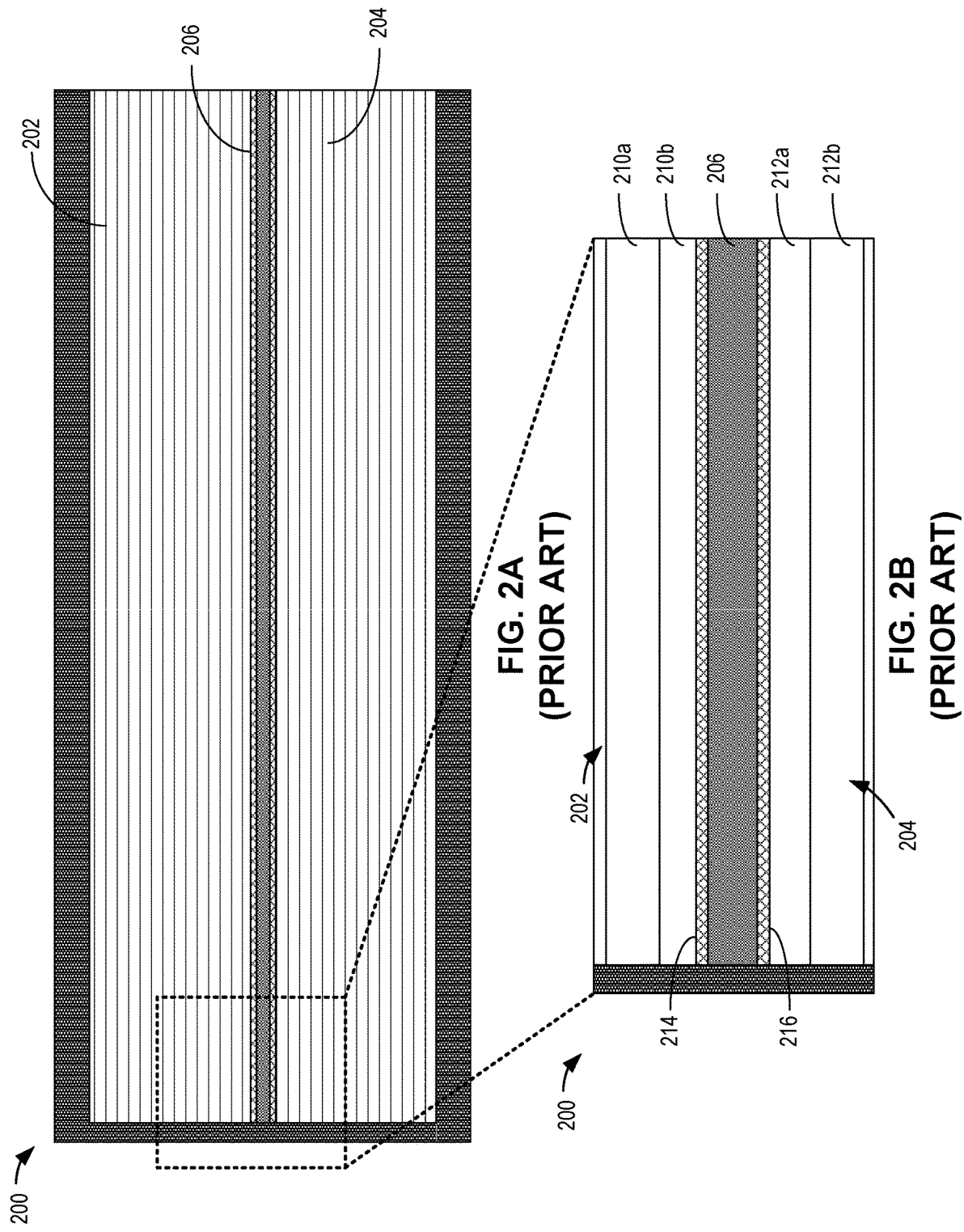

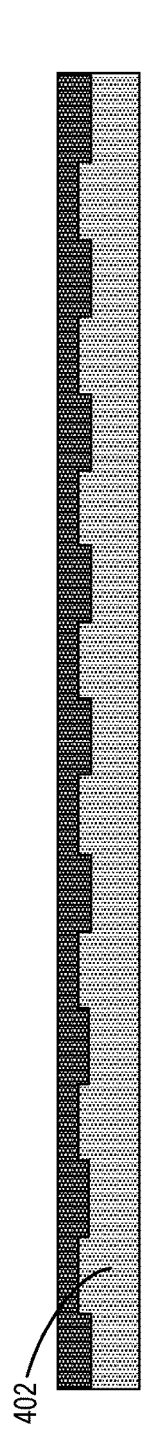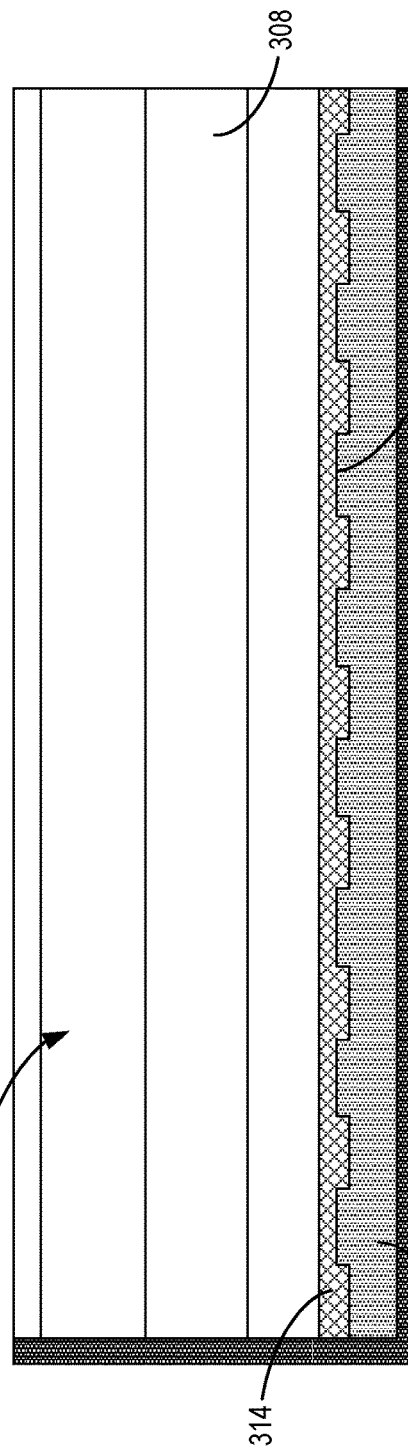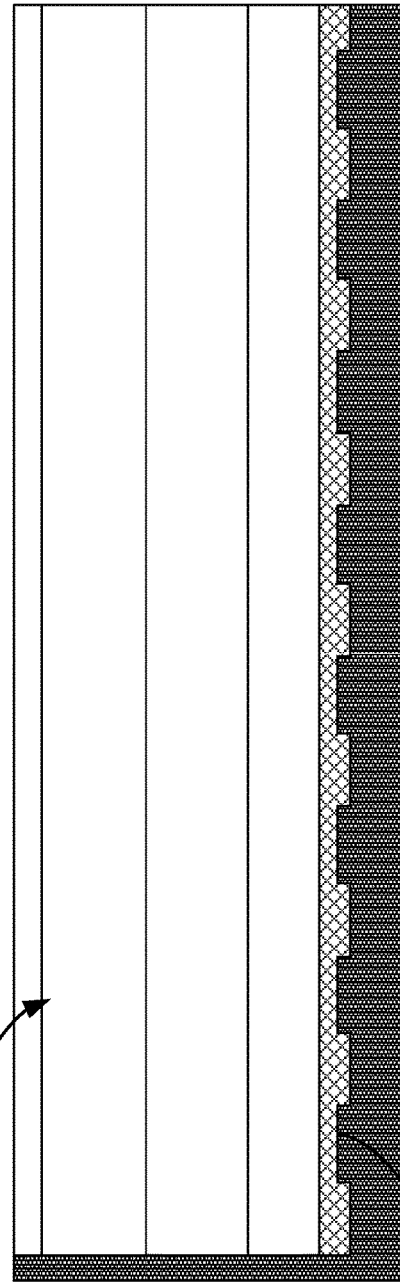

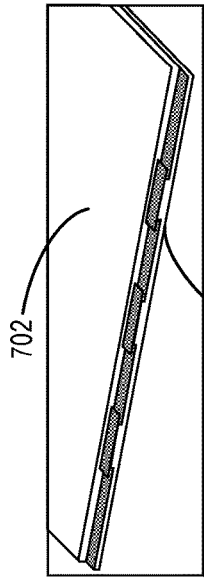
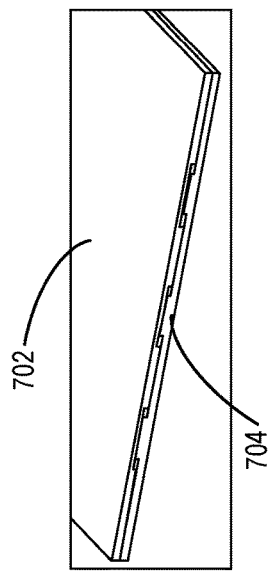
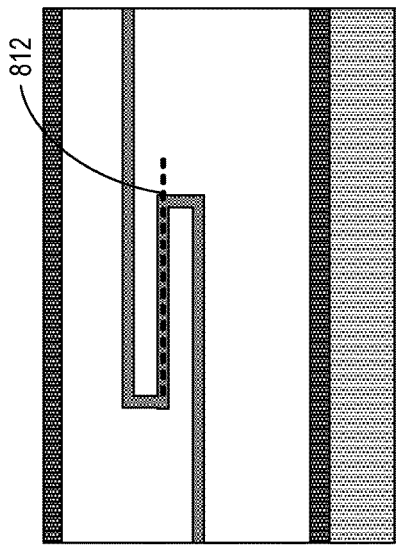
FIG. 8D
FIG. 8E
FIG. 8G
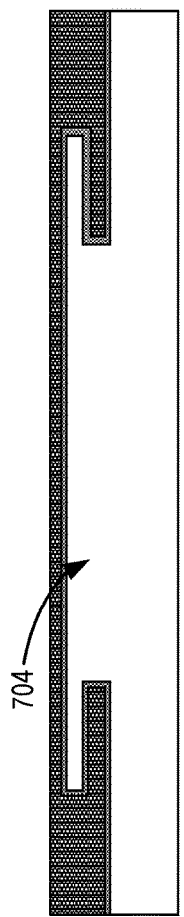
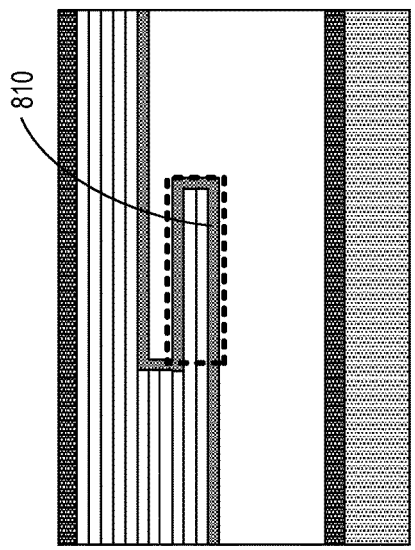
FIG. 8F

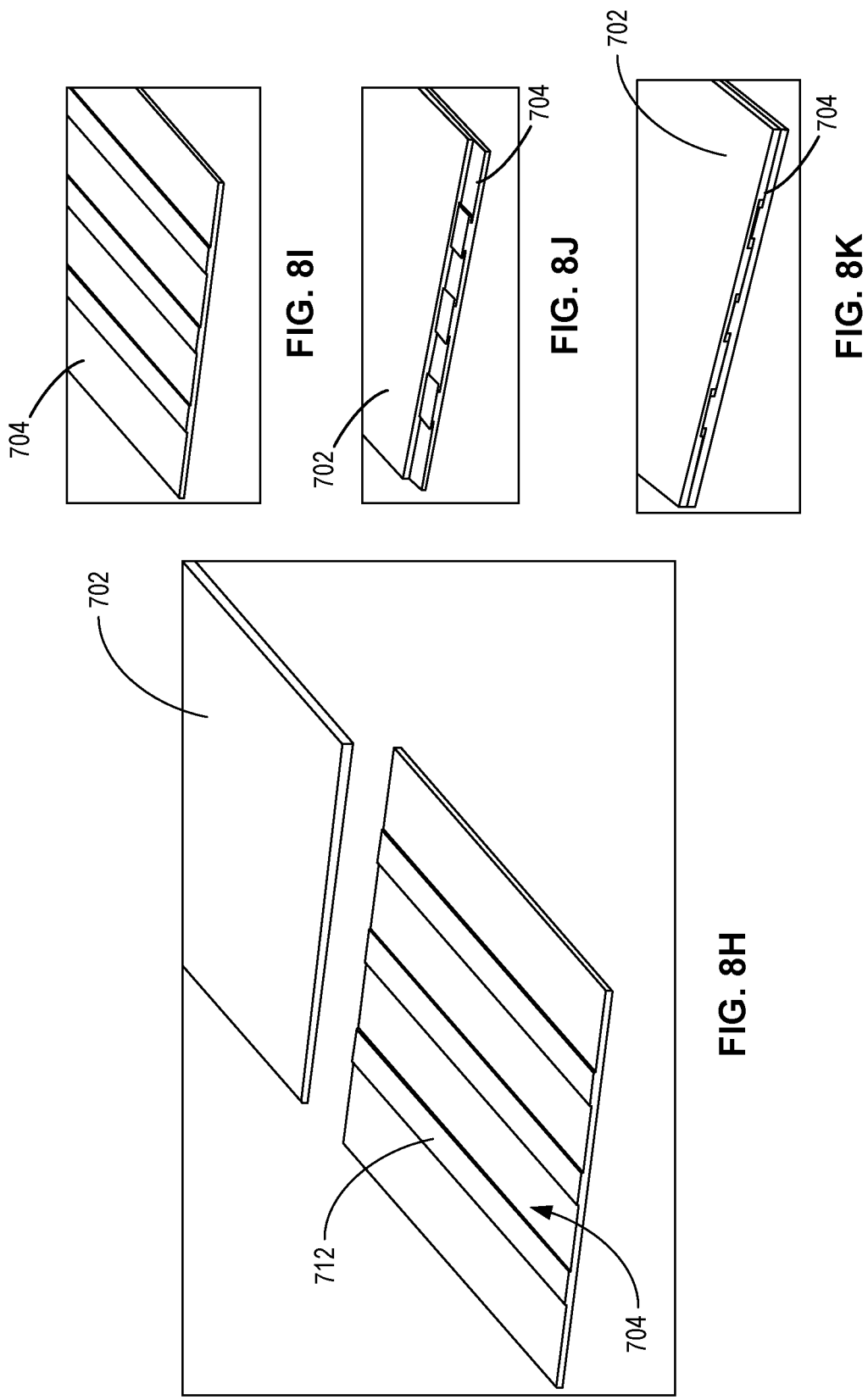

METHODS AND APPARATUS FOR TOOLING IN LAYERED STRUCTURES FOR INCREASED JOINT PERFORMANCE

FIELD OF THE DISCLOSURE

This disclosure relates generally to composite materials and, more particularly, to methods and apparatus for tooling in layered structures for increased joint performance.

BACKGROUND

Layered composite structures are typically used on an aircraft to define internal or external surfaces thereof. In particular, these layered structures are used on surfaces of a wing, a fin or a fuselage of the aircraft, as well as internal structures, such as longerons, fibs, frames, clips, amongst other internal structures. The composite structures are tailorable and are multilayered for different loading conditions and functions, including structural support, aesthetics, grounding, and geometric/physical requirements (e.g., flow altering capabilities and/or durability). To that end, the multilayered structures are usually composed of multiple layers/plies adhered together. Typically, it is important for the layered construction to have reliable and consistent bonding and/or curing between the plies/layers due to exposure to high loads, as well as relatively harsh environmental conditions, associated with flight. Further, functional films can be adhered to components and can be subject to separation and/or delamination from the components. In bonded composites structures, the quality or integrity of the adhesive bondline interface can dictate a mode of separation and/or a functional life of the composite structures.

Further, some aircraft implement functional films. In particular, the functional films can be utilized for lightning protection, ice protection, armor, erosion/wear strips, aesthetics, external surface properties, etc. Further, these functional films can be bonded to the aforementioned layered composite structures.

SUMMARY

An example method includes placing a tool onto a first substrate to define an impression in the first substrate, curing the first substrate, removing the tool from the first substrate to define a joint interface corresponding to the impression, and coupling, at the joint interface, the first substrate to a second substrate.

An example composite layer structure includes a first composite structure including at least two plies, the first composite structure having at least one indentation, and a second composite structure including at least two plies, the second composite structure coupled to the first composite structure via the at least one indentation.

An example interlocked composite structure includes first plies layered around an opening including a first narrow portion extending from a first interface surface at a first side of the first narrow portion, and a wide portion extending from the first narrow portion at a second side of the first narrow portion opposite the first side. The interlocked composite structure also includes second plies extending from a second interface surface, the second plies layered to define a protrusion including a second narrow portion extending from the second interface surface, and a second wide portion extending from the second narrow portion, the first interface surface and the second interface surface to contact one another such that the second narrow and wide portions of the protrusion are inserted into the first narrow and wide portions, respectively, of the opening of the first plies.

An example method includes placing a tool onto a functional film to define an impression in the functional film, removing the tool from the function film to define a bond interface corresponding to the impression, and coupling, at the bond interface, the first composite structure to a substrate.

BRIEF DESCRIPTION OF THE DRAWINGS

FIGS. 2A and 2B depict a known example multi-layered construction.

FIGS. 4A-4C depict aspects of producing the example multilayered bonded structure of FIG. 3.

FIGS. 8A-8K depict aspects of producing the example multilayered bonded structure of FIG. 7.

Figure 1:
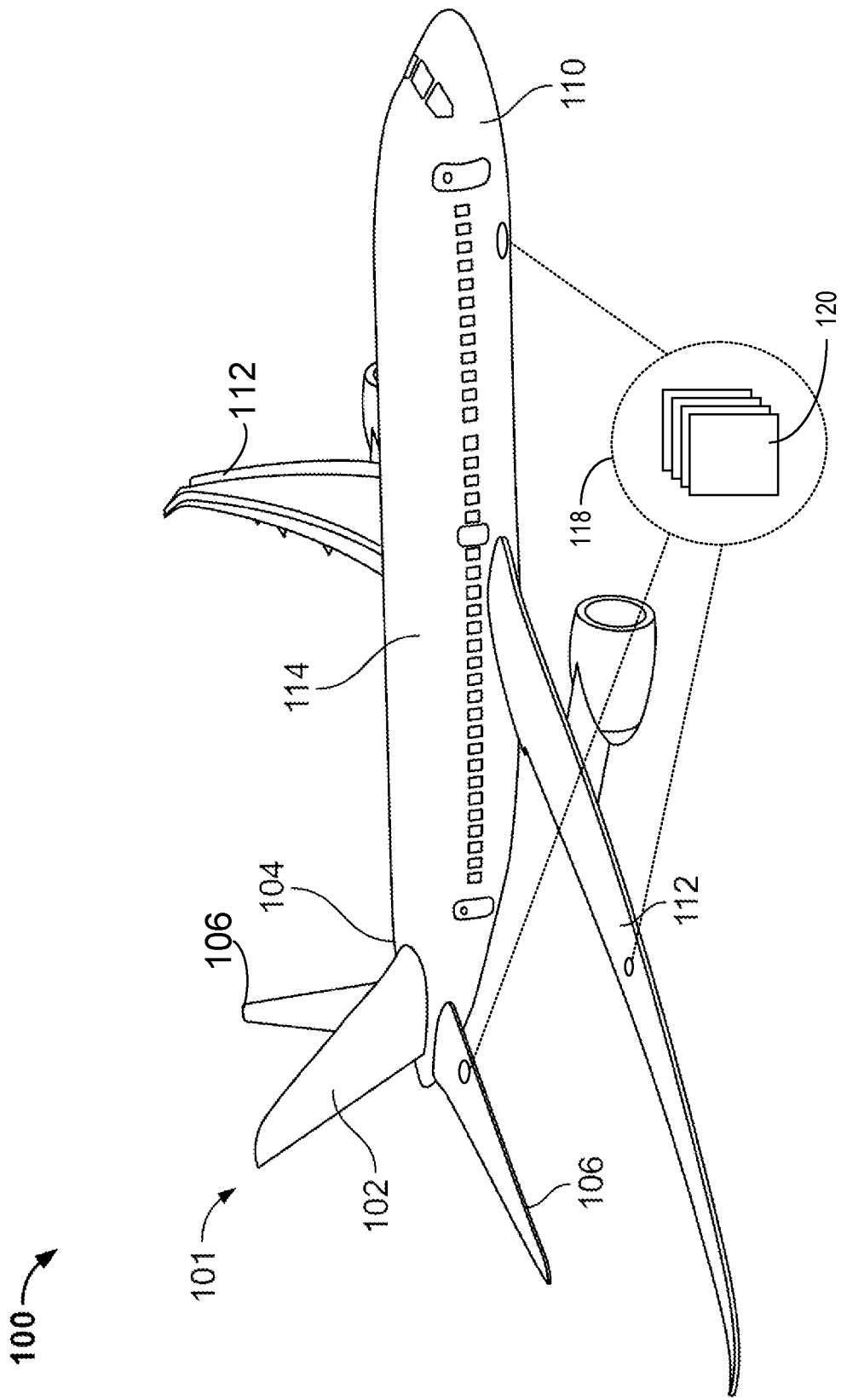
FIG. 1 illustrates an example aircraft that may implement the example methods and apparatus disclosed herein.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

DETAILED DESCRIPTION

Methods and apparatus for tooling in layered structures for increased joint performance are disclosed. Composite layered structures are typically used on an aircraft to define external surfaces thereof. In particular, these layered structures are used on surfaces of a wing, a fin or a fuselage of the aircraft, as well as internal structures, such as longerons, fibs, frames, clips, amongst other internal structures. To that end, the layered structures are usually composed of multiple layers/plies adhered together. Typically, it is important for the layered construction to have reliable and consistent bonding and/or curing between the plies/layers due to exposure to high loads, as well as relatively harsh environmental conditions, associated with flight. Further, functional films can be adhered to components and can be subject to separation and/or delamination from the components.

Examples disclosed herein enable relatively robust high-strength layered structures (e.g., bonded composite structures). Examples disclosed herein can enable crack arresting features. Examples disclosed herein can enable bonded structures that can reduce, mitigate and/or eliminate a probability of layer/ply separation or separation between a functional film (e.g., an erosion protection layer) and a substrate to which the function film is coupled. Manufacturing of sacrificial or reusable tooling used in examples disclosed herein can be relatively quick by utilizing tooling that can be quickly produced (e.g., via 3D printing). Examples disclosed herein can also enable composite structures or functional film structures/assemblies that can withstand significant loads by providing increased bonding strength between plies and/or bonded composite structures. Examples disclosed herein also enable production of highly complex geometries (e.g., curved shapes, curved channels, etc.) or micro-geometries that are on the scale of 0.001 inches (") to 0.01".

Examples disclosed herein utilize a sacrificial or reusable tool that is placed and/or pressed onto a first composite structure having first plies (or vice-versa), thereby defining an impression or shape of an interface (e.g., an interface portion, an interface surface, etc.) of the first composite structure. In some examples, a removal process, such as a vaporizing the sacrificial tooling components or dissolving the sacrificial tooling in water soluble, is applied to the first composite structure and/or the tool, thereby causing at least a portion of the tool to be removed (e.g., the tool is removed such that no more than 5% by volume or weight of the tool remains). Alternatively, the first composite structure and the tool are separated by moving the tool away from the first composite structure. In turn, a second composite structure with second plies or a substrate is applied to and/or coupled to the first composite structure at the aforementioned interface. Either of the first or second composite structures can be cured, pre-cured or uncured when being assembled to the other. In some examples, plies of the first composite structure and/or the second composite structure are layered and/or stacked relative to (e.g., based on) a shape of the sacrificial tool.

In some examples, a sacrificial or a reusable tool is utilized to define a relatively rough surface (with increased surface area) and/or a guiding feature (e.g., a wall or rail shaped guiding feature) at the interface, thereby increasing an effective bonding surface area and, thus, improving the bond strength between the composite structures. Additionally or alternatively, a sacrificial tool is utilized to define an interlock (e.g., an interlock feature) between the first and second composite structures. In some such examples, one of the first or second composite structures can have an aperture or opening while another of the first or the second composite structures includes a protrusion to be received by the aperture, thereby enabling the first and second composite structures to be constrained together in at least two different directions. According to examples disclosed herein, the protrusion can define an undercut to have a cross-sectional profile that is generally t-shaped, for example. Additionally or alternatively, the sacrificial tool can be utilized to define a channel, which may have a rectangular cross-sectional profile, to laterally constrain the first composite structure to the second composite structure.

Some examples disclosed herein are implemented with and/or between individual plies of a composite structure and/or layered structures that employ functional films. In some examples, an adhesive is applied between the first and second composite structures, functional films, and/or functional film substrates. According to examples disclosed herein, dissolvable tooling or vaporizable tooling can be utilized. In some such examples, water can act as a solvent. In specific examples in which the sacrificial tooling is vaporized at high temperatures, the sacrificial tool can at least partially composed of poly(lactic acid) (PLA). Additionally or alternatively, the sacrificial tool is at least partially composed of Tin (II) Oxalate (SnOx) (e.g., catalytic micro-particles of SnOx). However, any other appropriate sacrificial tool materials and/or sacrificial tool methodologies can be implemented instead. Further, while examples disclosed herein are shown in the context of aircraft composite structures, examples disclosed herein can be advantageously applied to any appropriate layering/bonding application.

In some examples, adhesive is applied in a non-uniform manner. For example, features, geometry and/or adhesive application can be varied across at least one component for applicable requirements (e.g., design requirements, conformance/compliance requirements, environmental requirements, etc.). Additionally or alternatively, examples disclosed herein can be associated with impact and/or energy dissipation features and/or structures.

As used herein the terms "laminate" and "composite structure" refer to a construction, component and/or assembly that has at least two plies. As used herein, the terms "interlock" and "interlock feature" refer to an interlocking component, geometry and/or feature that enables multiple composite structures to be constrained relative to one another in at least two directions. As used herein, the term "functional film" corresponds to a film and/or film assembly utilized for a certain operational purpose including, but not limited to, lightning mitigation, armor, erosion/wear, aesthetics, external surface properties, adhesion, etc. As used herein, the term "joint" refers to a component, device, assembly and/or application that couples two objects together. Accordingly, the term "joint" can correspond to a bonded layered interface.

FIG. 1 illustrates an example aircraft 100 in which the examples disclosed herein may be implemented. The aircraft 100 of the illustrated example includes a tail section 101 including a vertical fin 102 adjacent to a dorsal fairing 104, horizontal stabilizers 106, a nose section (e.g., a cockpit section) 110 and wings 112 attached to a fuselage 114. Examples disclosed herein may be applied to surfaces, components and/or features of any of the tail section 101, the nose section 110, the stabilizers 106, the wings 112 and/or the fuselage 114, or any other exterior or outboard structure (e.g., a wing strut, an engine strut, a canard stabilizer, etc.) and/or surface of the aircraft 100.

As can be seen in the illustrated example, a detail 118 shows a composite structure 120 in which examples disclosed herein can be implemented. In this example, the composite structure 120 is placed on and/or at least partially defines an aerodynamic surface of the aircraft 100. Additionally or alternatively, the composite structure 120 can be placed on any of the wings 112, the stabilizers 106, the fuselage 114 or any other appropriate position of the aircraft 100. Examples disclosed herein can also be implemented in conjunction with internal and/or partially enclosed components including, but not limited to, longerons, ribs, frames, skin-stringer, etc. While examples disclosed herein are shown in the context of the aircraft 100, examples disclosed herein can be implemented in any other appropriate application and/or vehicle type including, but not limited to, water vessels, ground vehicles, unmanned vehicles, etc.

FIGS. 2A and 2B depict cross-sectional views of a known multi-layered construction (e.g., multi-layered bonded composite construction) 200. As can be seen in FIG. 2A, the multi-layered construction 200 includes a first composite structure 202, a second composite structure 204 and a bond line 206 between the first composite structure 202 and the second composite structure 204 such that the first plies 202 and the second plies 204 are coupled to one another via the bond line 206. In this known implementation, the bond line 206 is approximately 0.008" in average thickness (based on variation across lateral distances). However, any other appropriate bond line thickness can be implemented instead.

FIG. 2B is a detailed view of the multi-layered construction 200 shown in FIG. 2A. As can be seen in FIG. 2B, the first composite structure 202 includes plies 210 (hereinafter plies 210a, 210b, etc.) while the second composite structure 204 includes plies 212 (hereinafter plies 212a, 202b, etc.). In turn, the ply 210b includes and/or is adjacent to a faying surface resin layer 214 while the ply 212a includes and/or is adjacent to a faying surface resin layer 216. In this known implementation, the plies 210a, 210b, 212a, 212b are each about 0.008" in thickness.

Figure 2C:
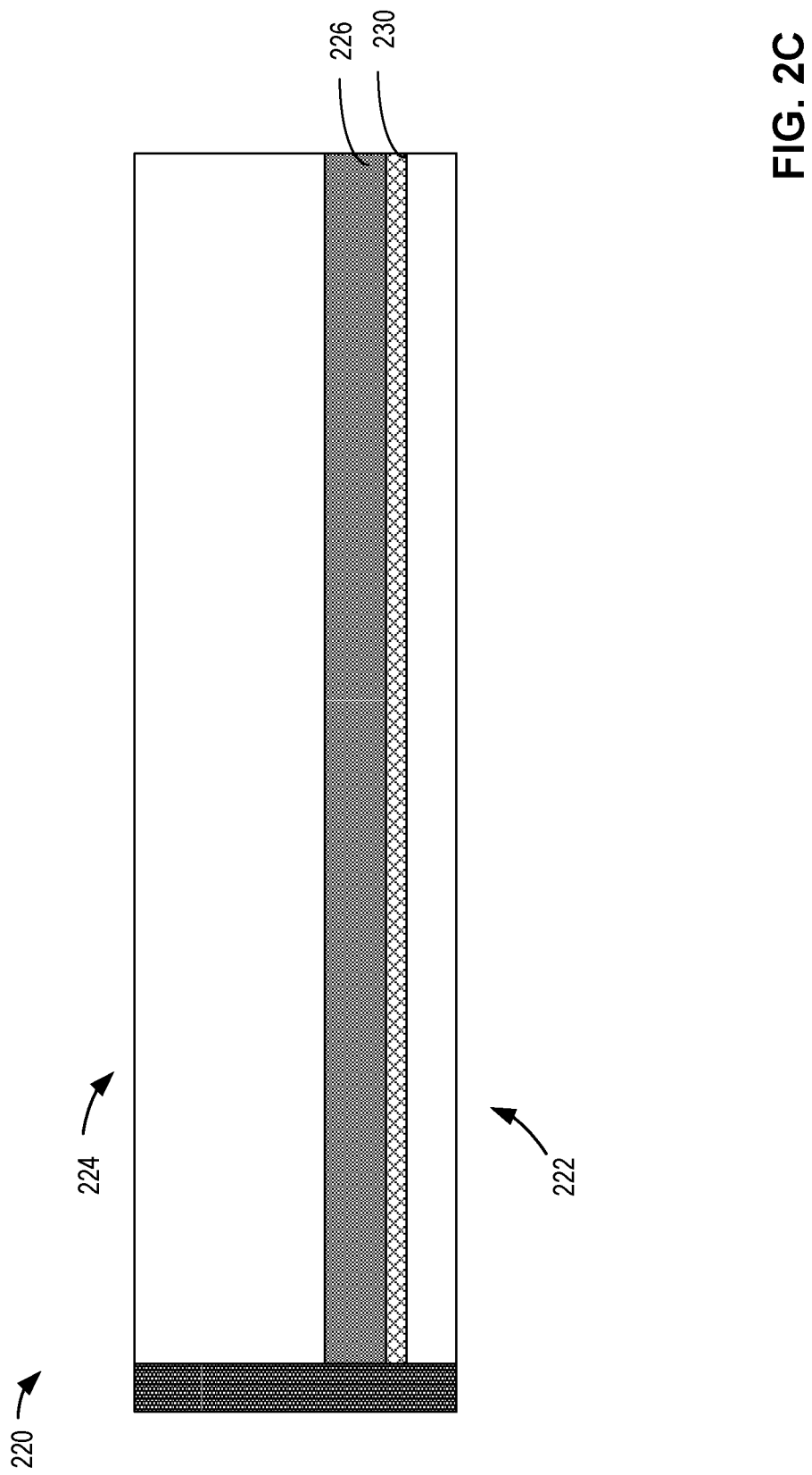
FIG. 2C is a cross-sectional profile an example functional film bonded structure in accordance with teachings of this disclosure.

FIG. 2C is a cross-sectional profile an example functional bonded film structure (e.g., a functional film assembly) 220 in accordance with teachings of this disclosure. In the illustrated example of FIG. 2C, the bonded film structure 220 includes a functional film 222 coupled to a substrate 224 via a bond line 226. In this examples, the functional film 222 includes a textured and/or indentation region 230 that increases a bond strength between the functional film 222 and the substrate 224. The textured and/or indentation region 230 can be defined and/or produced via a sacrificial or reusable tool, according to any of the examples described below in connection with FIGS. 3-9.

The example substrate 224 can include a layered composite structure with multiple plies, a support structure (e.g., a metal layer or component), a single ply, etc. Further, the example functional film 222 can be any appropriate material corresponding to operation of the aircraft 100, for example. In particular, the example functional film 222 can correspond to erosion protection, lightning mitigation, aesthetics, electrical isolation, ice protection, etc. In some examples, the functional film 222 includes and/or is at least partially composed of a polymer and/or an elastic film.

Figure 3:
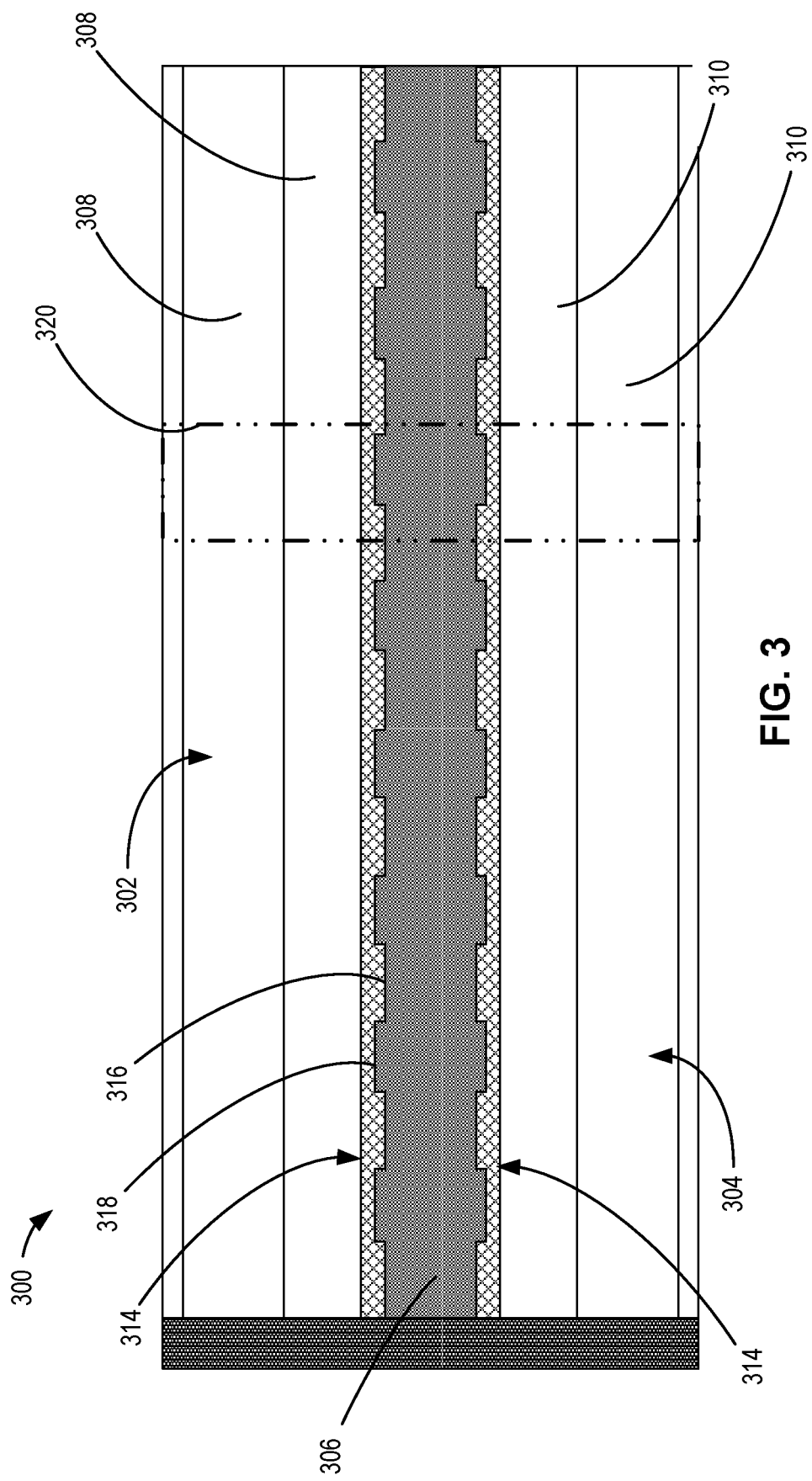
FIG. 3 is a cross-sectional view of an example multilayered bonded structure in accordance with teachings of this disclosure.

FIG. 3 is a cross-sectional view of an example multilayered bonded structure (e.g., a composite layer assembly) 300 in accordance with teachings of this disclosure. The multilayered bonded structure 300 of the illustrated example includes a first substrate 302, and a second substrate 304, both of which are composite structures in this particular example. According to examples disclosed herein at least one of the first substrate 302 or the second substrate 304 can be a composite structure, functional film or support (e.g., a metal support, a metal layer, etc.). In this example, the substrate 302 and the substrate 304 are separated by a bond line (e.g., an adhesive layer, a bond layer, etc.) 306. The example first substrate 302 and the example second substrate 304 are each in a generally stacked and/or layered arrangement. In this example, the first substrate 302 includes plies 308 while the second substrate 304 includes plies 310. In the illustrated example of FIG. 3, the bond line 306 is at least partially defined by an adhesive (e.g., a chemical adhesive) that couples the first substrate 302 to the second substrate 304.

In contrast to the known multilayered structure 200 shown in FIGS. 2A and 2B, faying surface resin layers 314 corresponding to the ply 308 and the ply 310 adjacent the bond line 306 include geometric features (e.g., roughness features) that increase a bonded surface area, thereby increasing adhesion associated with the bond line 306. In this example, protrusions 316 with corresponding indentations (e.g., impressions) 318 increase a surface contact area of the faying surface resin layers 314 with the adhesive of the bond line 306. As a result, the first substrate 302 and the second substrate 304 are more strongly adhered to one another than in the known multi-layered construction 200 of FIGS. 2A and 2B. As will be discussed in greater detail below in connection with FIGS. 5-6E, examples disclosed herein can implement a guide (e.g., a lateral guide). Further, as will be discussed in greater detail below in connection with FIGS. 7-8K, an interlock feature and/or geometry can be implemented by examples disclosed herein to effectively constrain composite structures to one another in multiple directions. However, any of the features and/or aspects described in connection with FIGS. 2C-8K can be combined with one another. For example, a channel or interlock feature can include faying surfaces and/or faying surface resin layers with increased roughness.

In some examples, a protrusion or pin 320 is implemented to align the first substrate 302 to the second substrate 304. In some such examples, the protrusion or pin 320 can at least partially extend through the first substrate 302 and the second substrate 304 to align them relative to one another. In some examples, the protrusion or pin 320 is at least partially defined by a shape of the substrate 302 and/or the substrate 304. In some examples, adhesive defining the bond line 306 is applied via discrete targeted application in relatively smaller regions (e.g., sensitive regions) where loading and/or disbonding can be more prevalent, thereby enabling tailoring a location and/or extent of adhered features for cost, producibility or other design and manufacturing considerations.

In some examples, features, geometry and/or adhesive application can be varied across at least one component for applicable requirements (e.g., design requirements, conformance/compliance requirements, environmental requirements, etc.). Additionally or alternatively, examples disclosed herein can be associated with impact and/or energy dissipation features and/or structures.

FIGS. 4A-4C depict aspects of producing the example multilayered bonded structure 300 of FIG. 3. Turning to FIG. 4A, an example tool 402, which may be a reusable tool or a sacrificial tool, is shown being constructed and/or defined. However, any other appropriate material(s) can be implemented instead. Further, the tool 402 can be molded, produced in an additive manufacturing process (e.g., 3-D printed), etc. or produced using another appropriate production and/or fabrication method.

FIG. 4B depicts the tool 402 placed against (e.g., pressed against) one of the plies 308 of the first substrate 302. In turn, an interface 404 is defined onto the faying surface 314.

FIG. 4C depicts the substrate 302 with the tool 402 (of FIGS. 4A and 4B) removed therefrom (e.g., subsequent to the substrate 302 being at least partially cured), thereby defining an exposed surface 406. In turn, the exposed surface 406 can be coupled to another composite structure (e.g., via an adhesive) or positioned to contact another composite structure. According to examples disclosed herein, the exposed surface 406 defines a relatively rough interface with increased surface area that can significantly increase adhesion. In some examples, the exposed surface 406 is applied with an adhesive prior to assembling the substrate 302 to the second substrate 304 (not shown).

Figure 5:
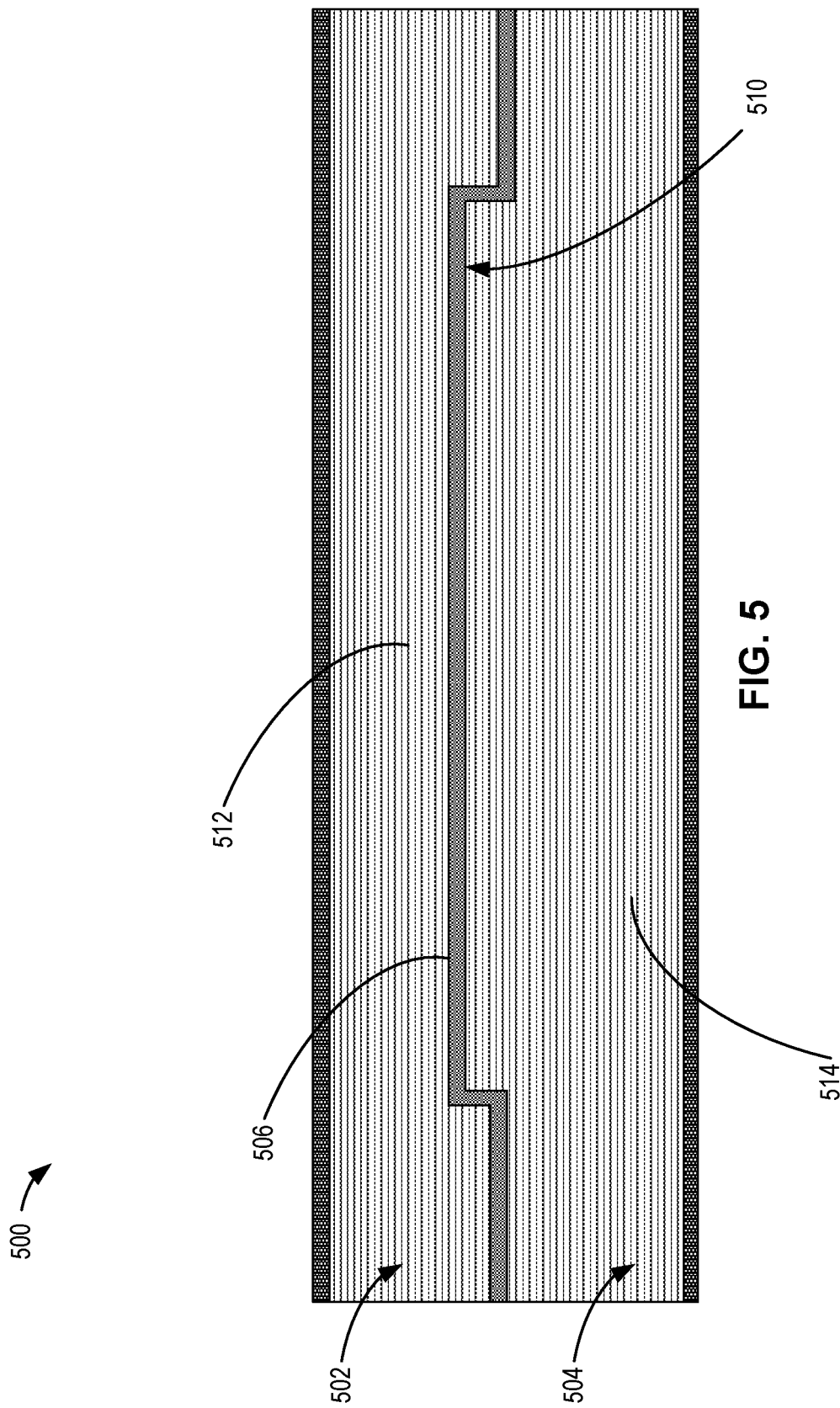
FIG. 5 is a cross-sectional view of another example multilayered bonded structure in accordance with teachings of this disclosure.

FIG. 5 is a cross-sectional view of another example multilayered bonded structure 500 in accordance with teachings of this disclosure. The example bonded structure 500 includes a guiding design and/or feature that enables joint redundancy, crack propagation resistance, and increased adhesion performance. Further, the example bonded structure 500 can be assembled in multiple directions (e.g., direct placement, sliding, etc.).

The multilayered bonded structure 500 of the illustrated example includes a first substrate 502, which is a composite structure in this example, coupled to a second substrate 504, which is also a composite structure in this example, via a bond line 506. According to examples disclosed herein at least one of the first substrate 502 or the second substrate 504 can be a composite structure, functional film or support (e.g., a metal support, a metal layer, etc.). In this example, the first substrate 502 and the substrate 504 define an interface 510 therebetween that is generally non-planar (e.g., keyed, jogged, etc.) to facilitate relative alignment (e.g., general lateral alignment in the view of FIG. 5) of the first substrate 502 and the substrate 504. In particular, the example interface 510 defines a rectangular channel that can be utilized to laterally constrain, align, position and/or restrain the first substrate 502 to the second substrate 504. In this example, the first substrate 502 include plies 512 while the second substrate 504 includes plies 514.

In the illustrated example of FIG. 5, as mentioned above, the first substrate 502 and the second substrate 504 are depicted bonded to one another via the bond line 506. In this example, a film adhesive and/or a paste adhesive is applied to at least one faying surface resin of one composite laminate, such as the first substrate 502 or the second substrate 504. In some examples, a film adhesive is cut into multiple segments to define an adhesive interface between the first substrate 502 and the second substrate 504. In some examples, tailored ply configurations are aligned such that designs overlap to create and/or define a jogged crack arresting feature.

As mentioned above in connection with FIG. 3, examples disclosed herein can implement alignment pins or other guide features to facilitate proper fitting between mating ply designs. According to examples disclosed herein, strip height and width can be examined such that too thin of a width can be difficult to manufacture while too wide of a strip can render a crack resistant feature ineffective. Examples disclosed herein can utilize 3D printed sacrificial tooling to enable a bonded structure design that is feasible with machining small/tight radii where jogged structures occur, which can be typically difficult or expensive to implement.

Figure 6A:
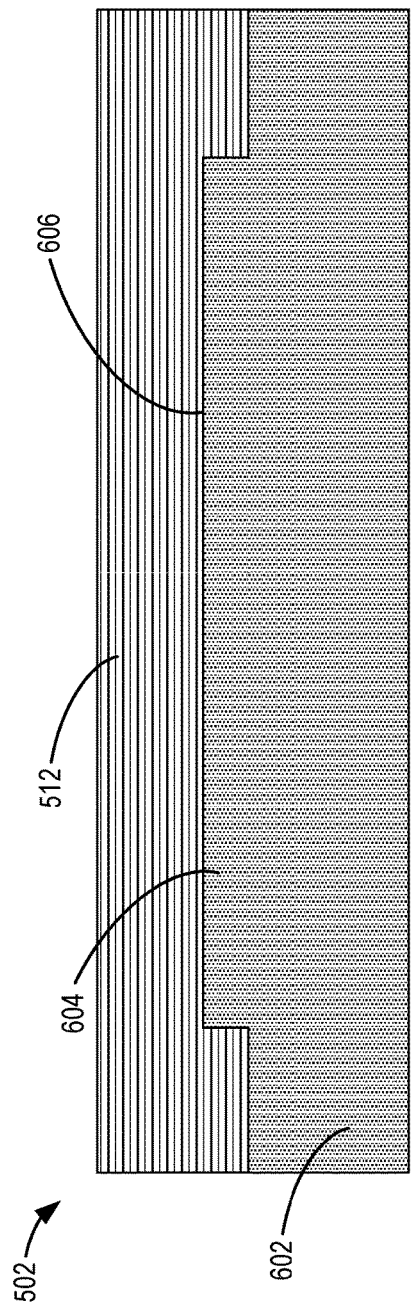
FIGS. 6A-6E depict aspects of producing the example multilayered bonded structure of FIG. 5.

FIGS. 6A-6E depict aspects of producing the example multilayered bonded structure 500 of FIG. 5. FIG. 6A is a detailed cross-sectional view depicting a tool 602 contacting the first substrate 502. In the illustrated example of FIG. 6A, multiple ones of the plies 512 are placed and/or stacked around a protrusion 604 of the tool 602.

In the illustrated example, the plies 512 are positioned (e.g., laid up) against the tool 602. Further, the example plies 512 are cut to match sacrificial tooling spacing against a desired faying surface resin. In turn, typical methods are implemented including, but not limited to, debulk, bag, cure, etc. After curing of an adhesive, the tool 602 can be embedded into the composite. In this example, an interface 606 includes an embedded textured faying surface resin subsequent to composite processing of the first substrate 502 and/or the plies 512.

Figure 6B:
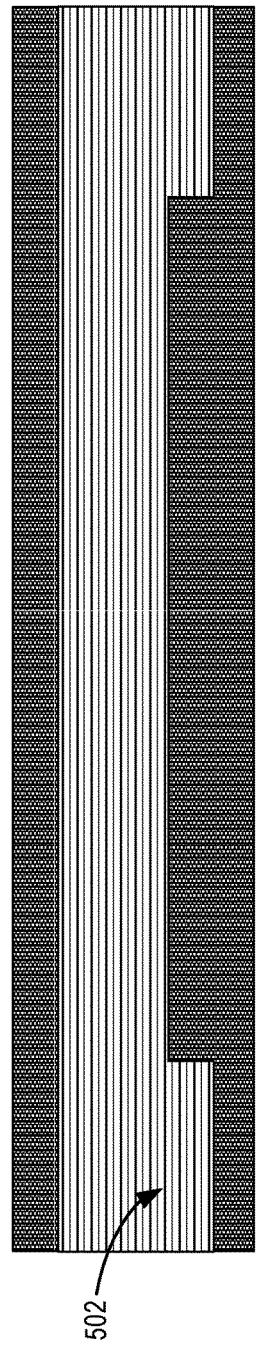
Figure 6C:
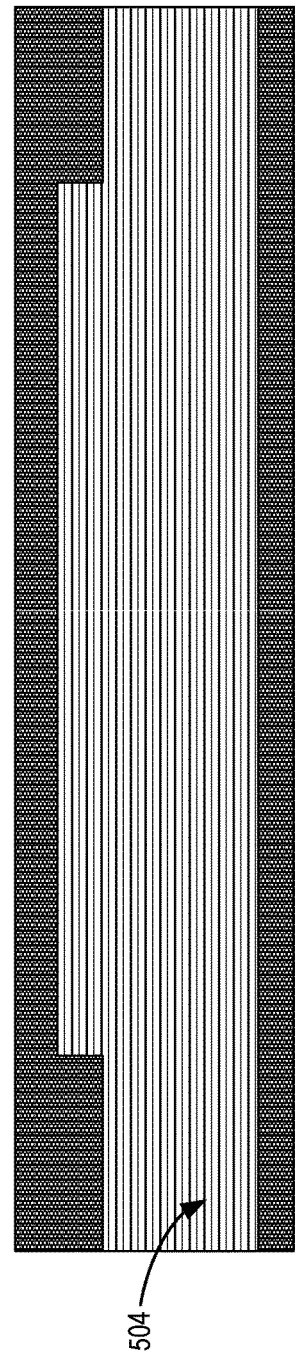

FIGS. 6B and 6C depict the first substrate 502 and the second substrate 504 following removal of the tool 602. The tool 602 can be moved away from the first substrate 502 or a sacrificial tool removal, such as a vaporization of the sacrificial tool process or a dissolving of the sacrificial tool process, can be implemented to remove the tool 602 shown in FIG. 6A. In some examples, the procedure vaporizes the sacrificial components is implemented to post-cure the first and second substrates 502, 504 with the tooling 602 embedded by placement in an oven under a full vacuum setting. In some such examples, a post-cure can be performed at approximately 390° Fahrenheit (F) for approximately 24 hours. In some other examples, the vaporization of the sacrificial tooling process is performed at lower temperature ranges (350°-390° F.), for a time duration of approximately 16 to 24 hours. The example views of FIGS. 6B and 6C depict tailored surface plies. In other examples, a sacrificial tool is not utilized.

Figure 6D:
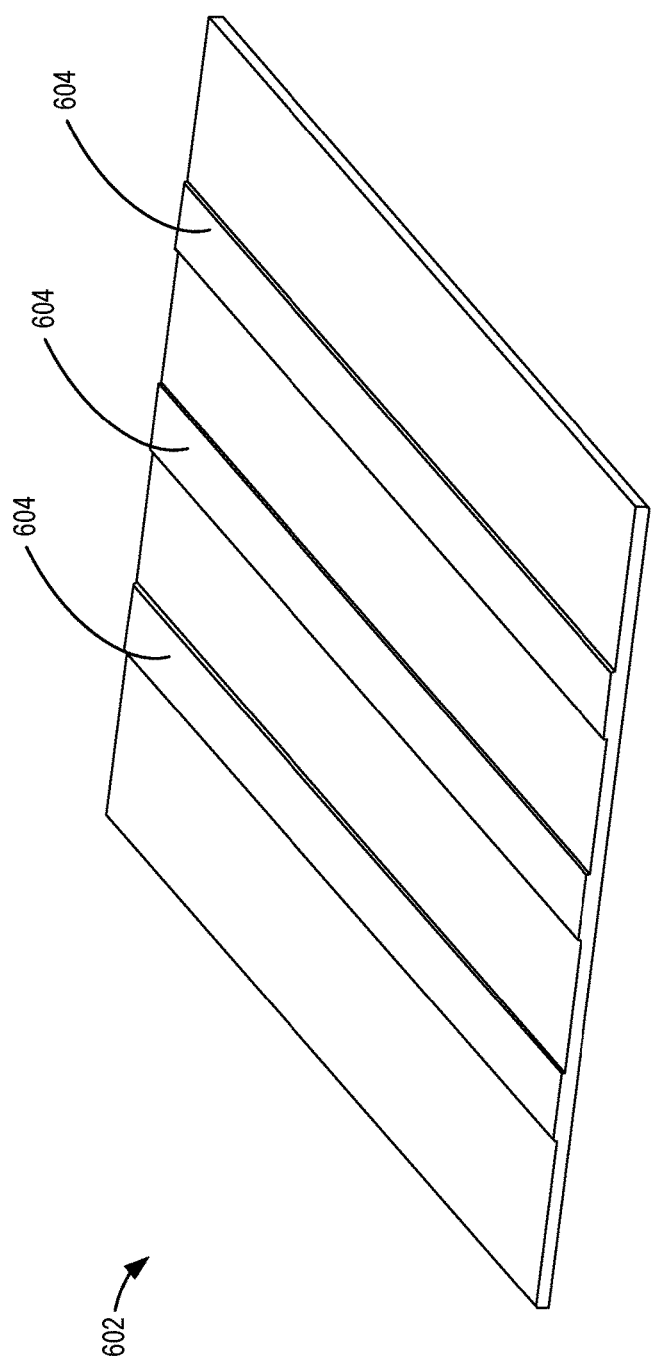

FIG. 6D is an isometric view of the example tool 602. In particular, the aforementioned protrusions 604 of the tool 602 are shown arranged in a pattern across a span thereof. In this example, an arrangement of the protrusions 604 defines a sliding channel in a laminate and/or composite structure that can facilitate alignment, as well as adhesion. In the illustrated example of FIG. 6D, the protrusions 604 are evenly spaced. However, in other examples, the spacing between the protrusions 604 may be varied and/or irregular (e.g., to facilitate flexibility in some portions while enabling greater rigidity in other portions).

Figure 6E:
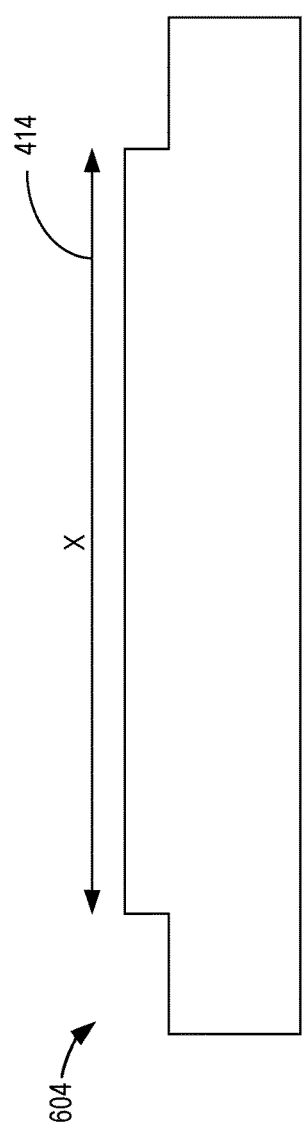

FIG. 6E depicts a detailed cross-sectional view of one of the protrusions 604. In this example, the protrusion 604 is generally represented by a dimension 414 denoted as "X," which is approximately 0.5". However, any other appropriate dimensions and/or scale can be implemented instead.

Figure 7:
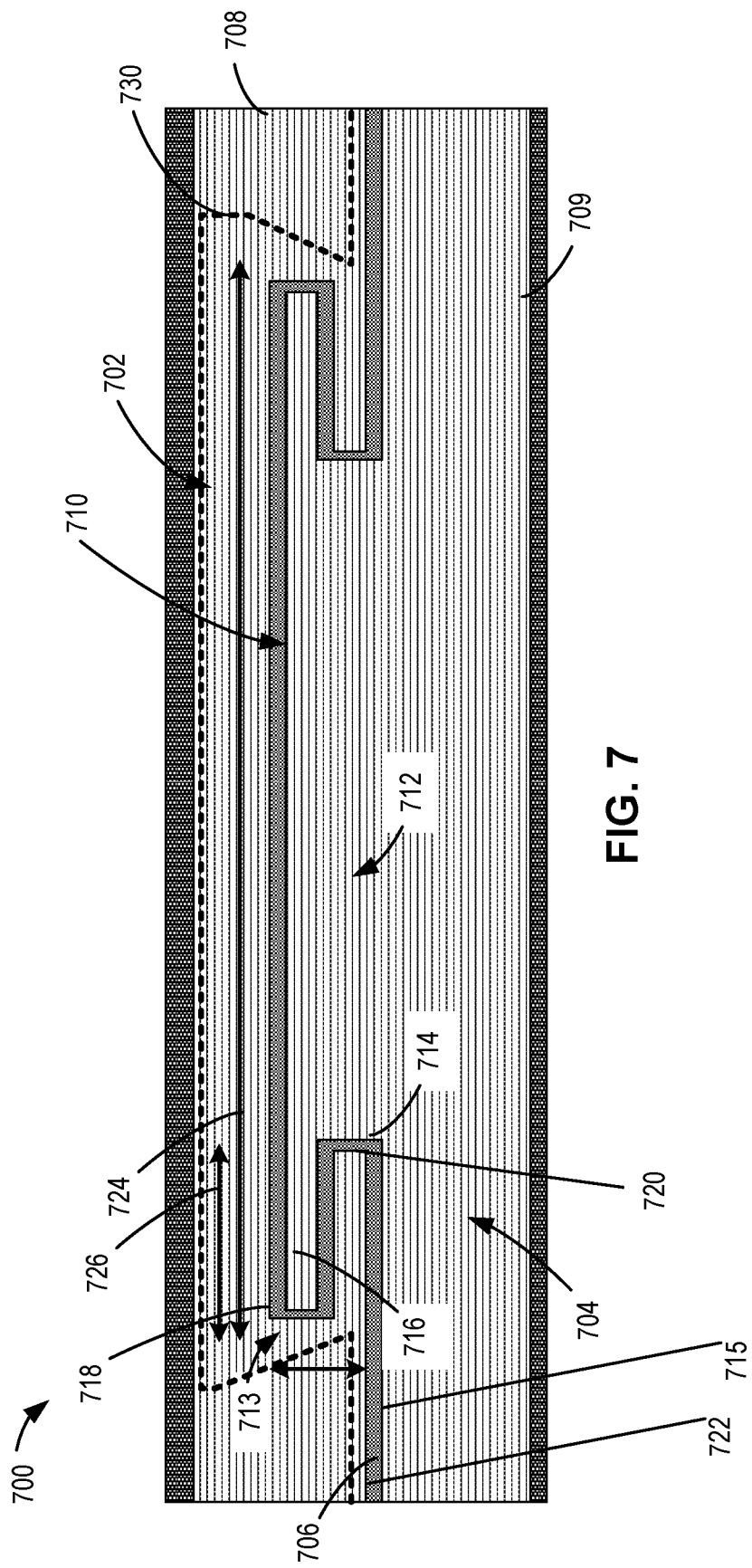
FIG. 7 is a cross-sectional view of another example multilayered bonded structure in accordance with teachings of this disclosure.

FIG. 7 is a cross-sectional view of another example multilayered bonded structure 700 in accordance with teachings of this disclosure. The example multilayered bonded structure 700 defines an interlocked arrangement and includes a first substrate 702 coupled to a s substrate 704 via a bond line 706. In particular, the first substrate 702 and the second substrate 704 are composite structures and define an interlocked interface 710 therebetween that is generally non-planar and/or jogged to facilitate general alignment and constraint of the first substrate 702 and the substrate 704 in multiple directions. In this example, the first substrate 702 includes plies 708 while the second substrate 704 includes plies 709.

To secure and/or align the first substrate 702 to the second substrate 704, the second substrate 704 includes a protrusion 712 to be received by an opening (e.g., an aperture, a shaped aperture, a receptacle) 713. In particular, the example protrusion 712 includes a narrow portion 714, which extends from a sealing interface 715, and a wide portion 716, the combination of which defines a generally t-shaped cross-sectional profile. In this example, the opening 713 includes a corresponding wide portion 718, as well as a corresponding narrow portion 720 which extends from a second sealing interface 722. As a result, the first substrate 702 is constrained horizontally and vertically (in the view of FIG. 7) to the second substrate 704. In other words, the first substrate 702 is interlocked to the second substrate 704. As a result, the example interlocked arrangement of FIG. 7 is significantly resistant to crack propagation.

In this particular example, an overall width 724 of an interlock can be approximately 0.500" while an overall width 726 of an undercut can be approximately 0.125." For example, a ratio of an undercut to the overall width can be approximately 0.20 to 0.30, However, any other appropriate dimensions and/or ratios can be implemented instead. Further, any other appropriate geometry for an interlock can be implemented instead. Some examples include a dovetail design, which is depicted as an outline 730 in FIG. 7, a tongue-in-groove shape, a triangular shape, a cross-shape, etc.

In some examples, structures and/or cutouts geometries that exhibit a relatively large degree of curvature and complexity can be implemented, and can also include curved channels, etc. resembling arteries or other vessels found in biological systems, for example. In other words, examples disclosed herein can utilize different sacrificial tool shape geometry to enable such curved shapes for layered composite structures and/or functional film structures.

Figure 8A:
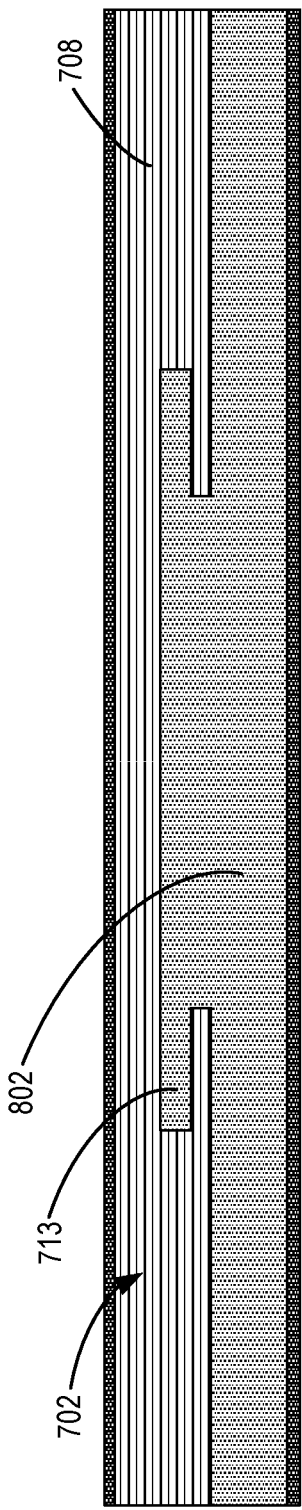

FIGS. 8A-8K depict aspects of producing the example multilayered bonded structure 700 of FIG. 7. Turning to FIG. 8A, a sacrificial tool 802 is shown placed relative to the first substrate 702. In this example, the positioning and/or placement of the sacrificial tool 802 defines the opening 713. In some examples, the plies 708 are placed and/or layered onto or around the tool 802.

Figure 8B:
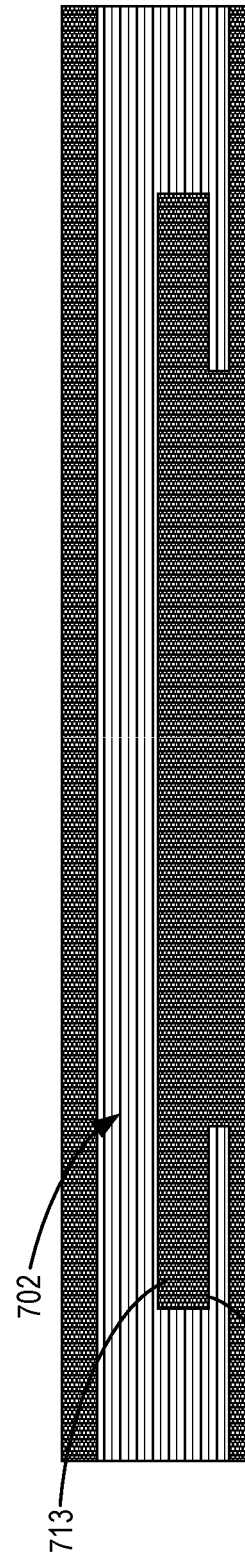

FIG. 8B depicts the first substrate 702 with the sacrificial tool 802 (shown in FIG. 7A) substantially removed via sacrificial tool removal process, which can be any appropriate removal process. As can be seen in the example of FIG. 8B, removal of the sacrificial tool 802 results in an undercut 804 of the opening 713.

Figure 8C:
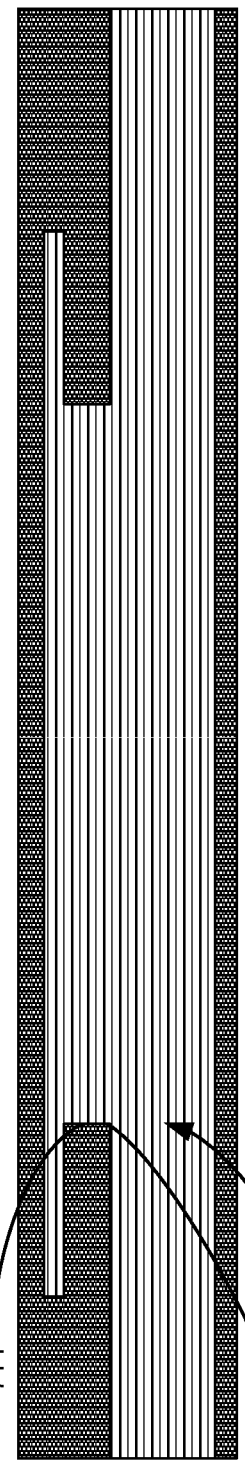

FIG. 8C depicts the second substrate 704 after removal of its corresponding sacrificial tool. In this example, the narrow portion 714 includes an undercut 806.

FIG. 8D depicts the second substrate 704 such that the first substrate 702 is slid relative to the second substrate 704 to couple the first substrate 702 to the second substrate 704. In this example, adhesive is applied to the second substrate 704 prior to the second substrate 704 being coupled to the first substrate 702.

In some examples, plies are co-cured with adhesive against a pre-cured composite substrate that has an interlocking composite geometry. In some examples, composite substrates that have interlocking composite geometry are pre-cured. In other words, a pre-cured structure may be applied with live plies and adhesive.

FIG. 8E depicts the first substrate 702 and the second substrate 704 coupled to one another. In particular, the first substrate 702 and the second substrate 704 are slid against one another (e.g., until outer lateral/perimeter edges are generally aligned).

According to examples disclosed herein, in order for the first substrate 702 and the second substrate 704 to be assembled, adhesive can be first placed on one at least one of the first substrate 702 or the second substrate 704, for example. The example first substrate 702 can be slid into place against the adhesive by utilizing the interlocking features therebetween as guide rails. In some examples, a combination of paste adhesive (e.g., in an interlocking area) and film adhesive (e.g., in an overall primary acreage area) may be utilized. In some such examples, the paste adhesive can act as a lubricant so that interlocking portions and/or features can slide past one another.

FIG. 8F depicts an example co-cured assembly implementation in which live plies and adhesive are applied against a precured substrate in a region 810. In some examples, the region 810 represents an area where plies and adhesive are not compacted.

FIG. 8G depicts an example co-bonded assembly implementation in which pre-cured substrates are attached. In this example, a region 812 corresponds to a bond line (e.g., a bond line portion) in which compaction does not significantly occur.

FIG. 8H depicts the first substrate 702 being initially placed and/or aligned relative to the second substrate 704. In this example, the protrusions 712 of the second substrate 704 are utilized to align the first substrate 702 relative to the second substrate 704 in a sliding motion during assembly.

FIGS. 8I-8K depicts multiple steps of the first substrate 702 being moved onto the second substrate 704. In particular, FIGS. 8I and 8J depict intermediate steps while FIG. 8K depicts the second substrate 704 being fully aligned relative to the first substrate 702. In some examples, an end stop or other feature is utilized to prevent further sliding of the first substrate 702 relative to the second substrate 704.

Figure 9:
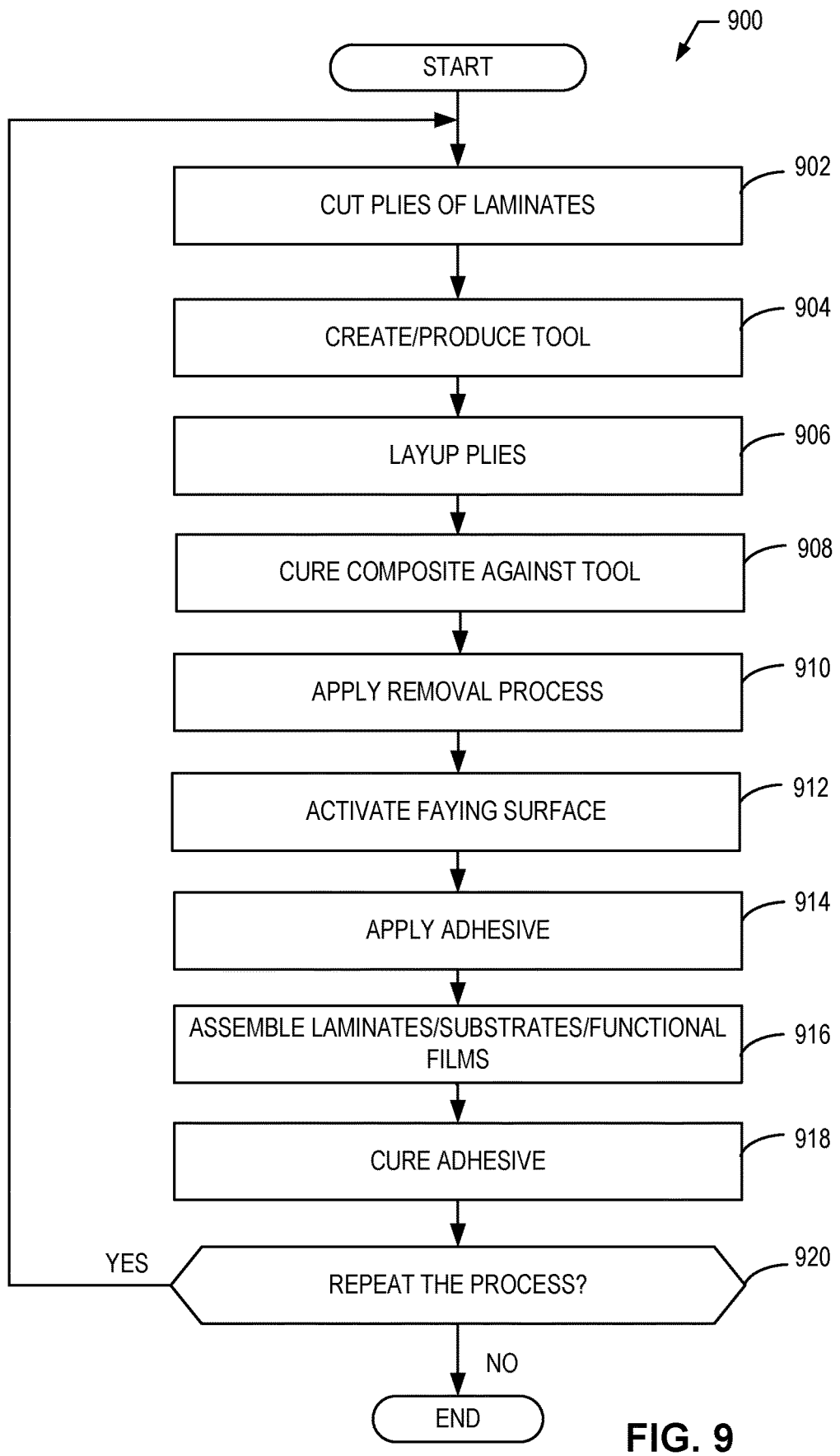
FIG. 9 is a flowchart representative of an example method that may be used to produce examples disclosed herein.

FIG. 9 is a flowchart representative of an example method 900 that may be used to produce examples disclosed herein. The flowchart of FIG. 9 corresponds to the example method 900 to produce examples disclosed herein. Example production and/or assembly methodology may be applied to maintenance, repair and overhaul. For example, the method 900 enables a thermal process to treat an outer surface of a thermoplastic film after a defined time (e.g., hours of service) utilizing a "mold" that imparts a specific texture before proceeding to adhesive bonding the new outer film layer or repair paste.

In some examples, at block 902, plies of laminates are cut. In some such examples, the plies are cut to be placed against a sacrificial tool and/or an alignment feature, such as a pin, for example. In the illustrated example, the plies are placed together to define at least one composite structure.

In the illustrated example, at block 904, a tool (e.g., the tool 402, the tool 602, the tool 802) is produced and/or built. In some examples, the tool is produced via 3D printing or other additive manufacturing processes and/or methodologies. In other examples, the tool may be molded or machined. The tool may be sacrificial or reusable.

At block 906, in this example, plies of the composite structure are assembled in a layup process. For example, individual plies are assembled and/or placed together in layers.

At block 908, the tool is placed at or adjacent the faying surface resin layer as the composite structure is cured. In some examples, the tool is pressed against the faying surface resin layer to define at least one indentation (e.g., while the composite structure is cured), thereby defining an impression onto the faying surface resin layer. Additionally or alternatively, plies are placed relative to the tool such that the plies at least partially surround and/or are layered around the tool.

At block 910, in some examples, a sacrificial tool removal process (e.g., a vaporization of the sacrificial components process, a dissolving of the sacrificial components in water process) is applied to the tool as the tool is placed against the plies. As a result, the tool is substantially removed (e.g., greater than 95% of the tool by volume is removed). In some examples, the tool is moved away from the composite structure.

At block 912, in some examples, a faying surface resin is activated. The activation can include mechanical and/or chemical activation. For example, mechanical activation can include Scotch-Brite™ scuff, grit blasting, or the like. Additionally or alternatively, chemical activation can include use of a solvent wipe. The faying surface resin and/or layer can be approximately 0.001-0.002" in thickness, for example.

At block 914, adhesive is applied to the at least one indentation and/or the faying surface resin layer. In this example, the adhesive is placed on a portion of an interface defined by the faying surface resin layer. In some examples, the adhesive is applied non-uniformly or only to portions of a substrate.

At block 916, the laminates, substrates, functional films and/or composite structures are assembled together. In this example, the laminates, substrates, functional films and/or composite structures are coupled together with the aforementioned adhesive at the interface having the at least one indentation. The at least one indentation can correspond to a roughness pattern or a feature, such as an interlock feature, for example.

At block 918, the adhesive is cured. According to examples disclosed herein, the adhesive can be cured with heat or a chemical process. However, any other appropriate curing process can be implemented instead.

At block 920, it is determined whether to repeat the process (block 920). If the process is to be repeated (block 920), control of the process returns to block 902. Otherwise, the process ends. The determination may be based on whether additional laminates, composite structures, functional films and/or composite assemblies are to be produced.

Example methods, apparatus, systems, and articles of manufacture to enable increased strength in composite structures are disclosed herein. Further examples and combinations thereof include the following:

Example 1 includes a method comprising placing a tool onto a first substrate to define an impression in the first substrate, curing the first substrate, removing the tool from the first substrate to define a joint interface corresponding to the impression, and coupling, at the joint interface, the first substrate to a second substrate.

Example 2 includes the method as defined in example 1, wherein the tool is a sacrificial tool removed via a vaporizing of sacrificial components process or a dissolving the sacrificial components with a fluid process.

Example 3 includes the method as defined in any of examples 1 or 2, wherein the removal of the tool defines an interlock feature of the first substrate.

Example 4 includes the method as defined in example 3, wherein the interlock feature is a first interlock feature, and further including coupling the second substrate to the first substrate by sliding a second interlock feature against the first interlock feature.

Example 5 includes the method as defined in example 4, further including applying an adhesive between the first and second interlock features.

Example 6 includes the method as defined in any of examples 1 to 5, wherein the interface is defined with a roughness pattern impressed upon the first substrate.

Example 7 includes the method as defined in any of examples 1 to 6, wherein the impression is defined by placing ones of plies of the first substrate to at least partially surround the sacrificial tool.

Example 8 includes the method as defined in any of examples 1 to 7, wherein the impression includes a rectangular channel that laterally constrains the first substrate to the second substrate.

Example 9 includes the method as defined in example 1, further including cutting plies of the first substrate, and layering the plies together to define the first substrate.

Example 10 includes a composite layer assembly comprising a first composite structure including at least two plies, the first composite structure having at least one indentation, and a second composite structure including at least two plies, the second composite structure coupled to the first composite structure via the at least one indentation.

Example 11 includes the assembly as defined in example 10, wherein the at least one indentation includes a relatively rough surface.

Example 12 includes the assembly as defined in any of examples 10 or 11, wherein the at least one indentation includes a guide or an interlock feature.

Example 13 includes the assembly as defined in example 12, wherein the interlock feature is a first interlock feature, and wherein the second composite structure includes a second interlock feature to slide against the first interlock feature.

Example 14 includes the assembly as defined in example 13, further including an adhesive between the first and second interlock features.

Example 15 includes an interlocked composite structure comprising first plies layered around an opening, the opening including a first narrow portion extending from a first interface surface at a first side of the first narrow portion, and a first wide portion extending from the first narrow portion at a second side of the first narrow portion opposite the first side, and second plies extending from a second interface surface, the second plies layered to define a protrusion including a second narrow portion extending from the second interface surface, and a second wide portion extending from the second narrow portion, the first interface surface and the second interface surface to contact one another such that the second narrow and wide portions of the protrusion are inserted into the first narrow and wide portions, respectively, of the opening of the first plies.

Example 16 includes the composite structure of example 15, wherein the protrusion includes a generally t-shaped cross-sectional profile.

Example 17 includes the composite structure of any of examples 15 or 16, further including an adhesive between the protrusion and the opening.

Example 18 includes a method comprising placing a tool onto a functional film to define an impression in the functional film, removing the tool from the function film to define a bond interface corresponding to the impression, and coupling, at the bond interface, the first composite structure to a substrate.

Example 19 includes the method as defined in example 18, wherein coupling the functional film to the substrate includes coupling the functional film to a composite structure with layered plies.

Example 20 includes the method as defined in any examples 18 or 19, wherein coupling the functional film to the substrate includes coupling the function film to a metal layer.

Example 21 includes the method as defined in any of examples 18 to 20, wherein the interface defined on the functional film includes a relatively rough surface.

Example 22 includes the method as defined in any of examples 18 to 21, further including curing the functional film prior to or as the tool is removed therefrom.

From the foregoing, it will be appreciated that example systems, methods, apparatus, and articles of manufacture have been disclosed that enable high-strength layered and/or stacked structures that can be resistant to separation and/or wear. Examples disclosed herein can also be cost-effective to manufacture. Examples disclosed herein may also enable lighter composite structures and/or functional film structures by facilitating increased strength and/or separation resistance. Examples disclosed herein can mitigate peeling, shearing, tension loads, bending, loads, etc.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A method comprising:
   placing a tool onto a first substrate to define an impression in the first substrate, the first substrate having first plies;
   curing the first substrate;
   removing the tool from the first substrate to define a joint interface corresponding to the impression, the removal of the tool from the first substrate to define a tab with a first undercut in the first substrate, the tab having a t-shaped cross-sectional profile; and
   coupling, at the joint interface, the first substrate to a second substrate, the second substrate having second plies, the second substrate having an opening with a second undercut, the tab to be inserted into the opening along a direction that is orthogonal to which planar surfaces of the first and second substrate extend.

2. The method as defined in claim 1, wherein the tool is a sacrificial tool removed via a vaporizing of sacrificial components process at relatively high temperatures or a dissolving of the sacrificial components with a fluid process.

3. The method as defined in claim 1, wherein the removal of the tool defines an interlock feature of the first substrate.

4. The method as defined in claim 3, wherein the interlock feature is a first interlock feature, and further including coupling the second substrate to the first substrate by sliding a second interlock feature against the first interlock feature.

5. The method as defined in claim 4, further including applying an adhesive between the first and second interlock features.

6. The method as defined in claim 1, wherein the interface is defined with a roughness pattern impressed upon the first substrate.

7. The method as defined in claim 1, wherein the tool is a sacrificial tool, and wherein the impression is defined by placing ones of the first plies of the first substrate to at least partially surround the sacrificial tool.

8. The method as defined in claim 1, wherein the impression includes a rectangular channel that laterally constrains the first substrate to the second substrate.

9. The method as defined in claim 1, further including:
   cutting the first plies of the first substrate; and
   layering the first plies together to define the first substrate.

10. A method comprising:
    placing a tool onto a functional film to define an impression in the functional film;
    removing the tool from the function film to define a bond interface corresponding to the impression, the removal of the tool to define a first undercut in the impression of the functional film; and
    coupling, at the bond interface, the functional film to a substrate, the substrate including a tab with a t-shaped cross-sectional profile, the substrate coupled to the functional film with the tab inserted into the impression along a direction that is orthogonal to which planar surfaces of the functional film and the substrate extend.

11. The method as defined in claim 10, wherein coupling the functional film to the substrate includes coupling the functional film to a composite structure with layered plies.

12. The method as defined in claim 10, wherein coupling the functional film to the substrate includes coupling the function film to a metal layer.

13. The method as defined in claim 10, wherein the interface defined on the functional film includes a relatively rough surface.

14. The method as defined in claim 10, further including curing the functional film prior to or as the tool is removed therefrom.

15. The method as defined in claim 1, wherein the t-shaped cross-sectional profile is defined by the first undercut and a third undercut of the tab on an opposite lateral side of the tab from the first undercut.

* * * * *